US012687203B2

(12) United States Patent
Mangold et al.

(10) Patent No.: US 12,687,203 B2
(45) Date of Patent: Jul. 21, 2026

(54) PREDETERMINED BREAKING BODY FOR A SHAFT OF A MACHINE, SHAFT HAVING A PREDETERMINED BREAKING BODY, AND MACHINE HAVING A SHAFT OF THIS TYPE

(71) Applicant: Bayerische Motoren Werke Aktiengesellschaft, Munich (DE)

(72) Inventors: Julian Mangold, Munich (DE); Michael Staake, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 257 days.

(21) Appl. No.: 18/684,572

(22) PCT Filed: Aug. 2, 2022

(86) PCT No.: PCT/EP2022/071683
§ 371 (c)(1),
(2) Date: Feb. 16, 2024

(87) PCT Pub. No.: WO2023/025537
PCT Pub. Date: Mar. 2, 2023

(65) Prior Publication Data
US 2024/0384763 A1 Nov. 21, 2024

(30) Foreign Application Priority Data
Aug. 27, 2021 (DE) .................... 10 2021 122 223.0

(51) Int. Cl.
*F16D 9/08* (2006.01)
*F16D 9/04* (2006.01)

(52) U.S. Cl.
CPC ................. *F16D 9/08* (2013.01); *F16D 9/04* (2013.01); *F16B 2200/63* (2023.08); *Y10T 428/12194* (2015.01)

(58) Field of Classification Search
CPC .......... F16D 9/08; F16D 9/04; F16B 2200/63; Y10T 428/12194
(Continued)

(56) References Cited

U.S. PATENT DOCUMENTS 4,447,217 A * 5/1984 Blandford ................. F16D 9/04
464/32
5,474,408 A * 12/1995 Dinitz ..................... E01F 9/635
403/2
6,059,085 A 5/2000 Farnsworth

FOREIGN PATENT DOCUMENTS

DE 1 190 744 B 4/1965
DE 26 26 635 A1 1/1977
(Continued)

OTHER PUBLICATIONS

International Search Report (PCT/ISA/210) issued in PCT Application No. PCT/EP2022/071683 dated Dec. 6, 2022 with English translation (5 pages).
(Continued)

*Primary Examiner* — Greg Binda
(74) *Attorney, Agent, or Firm* — Crowell & Moring LLP

(57) ABSTRACT

A predetermined breaking body of a shaft of a machine includes a first sub-body, a second sub-body, and a predetermined breaking element. The first and second sub-bodies are connected to one another, so as to conjointly rotate, along a longitudinal center axis of the predetermined breaking body via the predetermined breaking element. The predetermined breaking element is anisotropic, such that during transmission of a torque between the sub-bodies, the predetermined breaking element yields in a first torsion direction under a first predetermined ultimate torsional moment and yields in a second torsion direction opposed to the first
(Continued)

torsion direction under a second predetermined ultimate torsional moment. The predetermined ultimate torsional moments differ in size.

11 Claims, 2 Drawing Sheets

(58) Field of Classification Search
 USPC ................................. 464/32; 403/2; 428/572
 See application file for complete search history.

(56) References Cited

FOREIGN PATENT DOCUMENTS

| | | |
|---|---|---|
| DE | 10 2019 218 500 A1 | 6/2021 |
| JP | 2007-177793 A | 7/2007 |
| WO | WO 90/05248 A1 | 5/1990 |

OTHER PUBLICATIONS

German-language Written Opinion (PCT/ISA/237) issued in PCT Application No. PCT/EP2022/071683 dated Dec. 6, 2022 with English translation (8 pages).
German-language Search Report issued in German Application No. 10 2021 122 223.0 dated Nov. 9, 2021 with partial English translation (11 pages).

* cited by examiner

PREDETERMINED BREAKING BODY FOR A SHAFT OF A MACHINE, SHAFT HAVING A PREDETERMINED BREAKING BODY, AND MACHINE HAVING A SHAFT OF THIS TYPE

BACKGROUND AND SUMMARY

The present disclosure relates to a predetermined breaking body for a shaft of a machine, in particular of an electric machine, to a shaft having a predetermined breaking body of this type, and to a machine, in particular an electric machine and/or a motor vehicle, having a shaft of this type.

Shafts for transmitting torque and/or rotational speed and being designed with a predetermined breaking point are known in the technical field of mechanical engineering, in particular vehicle construction. These shafts satisfy a breaking criterion equally in both torsion directions since the conventional shafts are produced from an isotropic material. Shafts of this type are known for example from DE 26 26 635 A1 and DE 10 2019 218 500 A1.

However, in mechanical engineering, in particular in vehicle construction, there is the need to use shafts or predetermined breaking points which, during torque transmission by twisting of the shaft or predetermined breaking point in a first torsion direction, yield, during use as intended, under a first ultimate moment and, during torque transmission by twisting of the shaft or predetermined breaking point in a second torsion direction, yield, during use as intended, under a second ultimate moment. The first ultimate moment and the second ultimate moment differ from each other. That is to say, the first ultimate moment and the second ultimate moment differ both in respect of the sign (torsion direction in which the ultimate moment is applied to the shaft) and also in respect of the magnitude. This is of significance, for example, in motor vehicles which have an electric machine for at least partially electrically driving or moving the motor vehicle. This is because such electric machines of motor vehicles can be operated in a motorized mode, in which at least one wheel of the motor vehicle is driven by means of the electric machine. Furthermore, electric machines of this type can be operated in a generator mode (recuperation mode), in which the electric machine is driven by means of at least one of the wheels of the motor vehicle. In the motorized mode of the electric machine or of the motor vehicle, that is to say in the driving situation, a torque which is provided by means of the electric machine is therefore intended to be transmitted reliably and without failure of the shafts involved in the torque transmission. By contrast, however, a torque of this level in the generator mode of the electric machine or of the motor vehicle, that is to say in the recuperation situation, must not be transmitted by means of the shafts involved in the torque transmission, for example in order to avoid damage to the electric machine. In this case, at least one of the shafts involved in the torque transmission, during use as intended, is intended to already fail at a torque which is smaller than the maximum torque which is transmitted in the driving situation.

One object of the disclosure to provide a particularly simple possibility of limiting torque transmission by means of a shaft in a first torsion direction to a first ultimate torsional moment and in a second torsion direction to a second ultimate torsional moment different from the first ultimate torsional moment.

This and other objects are achieved by the subject matter of this disclosure. Further possible refinements of the disclosure are also disclosed in the description and the figures.

The predetermined breaking body according to the disclosure is provided for a shaft of a machine. The machine is, for example, an electric machine, e.g. a traction motor of an electrically driveable motor vehicle. Furthermore, the machine can be the motor vehicle itself. The shaft is, for example, an output shaft of the electric machine, for example a rotor shaft of the electric machine. In an appropriate installation position of the predetermined breaking body, the shaft therefore has the predetermined breaking body. For this purpose, the shaft has, for example, a first sub-shaft body and at least one second sub-shaft body which are connected to each other, for conjoint rotation, by means of the predetermined breaking body as long as an ultimate torsional moment of the predetermined breaking body is not exceeded.

The predetermined breaking body has a first sub-body, at least one second sub-body and a predetermined breaking element, wherein the sub-bodies of the predetermined breaking body are connected to one another, for conjoint rotation, along a longitudinal center axis of the predetermined breaking body by means of the predetermined breaking element. For example, the sub-bodies and the predetermined breaking element are formed integrally with each other.

The predetermined breaking element, for example a material of the predetermined breaking element, is anisotropic, as a result of which, during the transmission of a torque between the sub-bodies, the predetermined breaking element and, consequently, the predetermined breaking body yield in a first torsion direction under a first predetermined or predeterminable ultimate torsional moment and yield in a second torsion direction opposed to the first torsion direction under a second predetermined or predeterminable ultimate torsional moment, wherein the predetermined ultimate torsional moments differ in size. It is thereby ensured that, by means of the predetermined breaking body or by means of a shaft provided with the predetermined breaking body, torque transmission in the first torsion direction is limited to the first predetermined or predeterminable ultimate torsional moment, whereas torque transmission by means of the same predetermined breaking body or by means of the same shaft in the second torsion direction is limited to the second ultimate torsional moment. This is because the predetermined breaking body or the predetermined breaking element, during use as intended, yields in the first torsion direction earlier or later than in the second torsion direction. It is therefore ensured in an advantageous manner that a different torque can be transmitted in the first torsion direction than in the second torsion direction of the predetermined breaking body or of the shaft provided with the predetermined breaking body. If a shaft of this type is used, for example, in an electrically driveable or movable motor vehicle, it is thus possible, for example in the recuperation mode or in the generator mode of an electric drive machine of the motor vehicle, to avoid too high a torque being conducted to the electric drive machine, whereas, in the motorized mode of the electric drive machine, a higher torque can be conducted to wheels of the motor vehicle. In other words, the ultimate torsional moments are assigned to different types of operation or operating situations of the predetermined breaking body or of the shaft or the machine. Provision is made here in particular that the predetermined breaking body or the shaft is rotated in a different direction of rotation or rotational direction about the longitudinal center axis, depending on the operating situation.

A further refinement of the predetermined breaking body makes provision for the predetermined breaking body to have a fiber-reinforced material structure. The fiber-reinforced material structure has a carrier material matrix and reinforcing fibers, wherein the reinforcing fibers are embedded in the carrier material matrix. The reinforcing fibers are arranged at a fiber angle with respect to the longitudinal center axis or rotational axis of the predetermined breaking body. This means that the fiber angle is enclosed between the longitudinal center axis and the reinforcing fibers. An angular size of the fiber angle is different from 0 degrees and from 90 degrees, that is to say the fiber angle is greater than 0 degrees and smaller than 90 degrees. In particular, during the manufacturing of the predetermined breaking body, provision is made to arrange the reinforcing fibers at a fiber angle between 10 degrees and 80 degrees with respect to the longitudinal center axis of the predetermined breaking body.

At least one of the reinforcing fibers acts as a predetermined breaking element of the predetermined breaking body. In other words, the predetermined breaking element of the predetermined breaking body is formed by at least one of the reinforcing fibers. This is because since the reinforcing fibers, for example glass fibers, carbon fibers, etc., by design can only absorb or transmit a relevant amount of tensile loading, the fiber-reinforced material structure, that is to say the predetermined breaking body, is anisotropic in respect of torque transmission. The reinforcing fibers are arranged in particular according to a helix, and therefore the reinforcing fibers spiral around the longitudinal center axis. A pitch angle of said helix or screw corresponds to the fiber angle. During the operation of the predetermined breaking body or during the operation of the shaft equipped with the predetermined breaking body, the reinforcing fibers, for example in the first torsion direction, are primarily loaded in tension, whereas the reinforcing fibers, for example in the second torsion direction opposed to the first torsion direction, are primarily loaded in compression and/or thrust. In the first torsion direction, the maximally transmittable torque is therefore decisively determined by a tensile strength of the reinforcing fibers, whereas the maximally transmittable torque in the second torsion direction is determined primarily by a torsional strength of the carrier material matrix. This is substantially lower than the tensile strength of the reinforcing fibers, thus resulting in the desired predetermined breaking behavior of the predetermined breaking body. During the operation of the predetermined breaking body, the corresponding reinforcing fiber therefore tears if, during the torque transmission by means of the predetermined breaking body in the first torsion direction, the first ultimate torsional moment and, as a consequence, a tensile fracture force of the corresponding reinforcing fibers are reached or exceeded. By contrast, the carrier material matrix breaks during the transmission of torque in the second torsion direction if the second ultimate torsional moment and, as a consequence, an ultimate torsional moment of the carrier material matrix are reached or exceeded.

The predetermined breaking body which has the fiber-reinforced material structure and, as a consequence, the shaft equipped with the predetermined breaking body are particularly easily formed by the use of fiber-reinforced material, for example CFRP, etc., as a result of which a motor vehicle equipped with the shaft can be operated particularly fuel- and energy-efficiently and/or with low emissions.

In an alternative or further refinement of the predetermined breaking body, the predetermined breaking body is formed from a metallic material, wherein the predetermined breaking body has, between the sub-bodies, at least one material recess. The material recess extends from an outer circumferential surface of the predetermined breaking body radially in the direction of the longitudinal center axis. The predetermined breaking element is thereby formed by the at least one material recess. The predetermined breaking body made from the metallic material can therefore have, for example, a plurality of material recesses which are arranged independently of one another in/on the outer surface of the predetermined breaking body. Furthermore, it is conceivable that the material recess runs in accordance with a helix along the outer circumferential surface of the predetermined breaking body. The material recess or the material recesses can be arranged at a material recess angle different from 0 degrees and from 90 degrees with respect to the longitudinal center axis or rotation axis of the predetermined breaking body. The material recess angle is formed, for example, analogously to the fiber angle which has already been presented further above.

Expressed in other words, according to a further refinement of the predetermined breaking body, the material recess can be helical, wherein the predetermined breaking body has, between the sub-bodies, at least one full thread of the helical material recess. The predetermined breaking element of the predetermined breaking body is formed by this at least one thread of the helical or spiral material recess.

By this means, a different ultimate torsional moment depending on the torsion direction of the predetermined breaking body or of the shaft equipped with the predetermined breaking body is advantageously ensured since the predetermined breaking body is formed anisotropically with respect to the torque transmission because of the material recess or material recesses. The predetermined breaking body formed from the metallic material is particularly advantageous because of its size if an oscillating behavior or vibration behavior of the predetermined breaking body occurs during operation of the shaft, as a result of which in particular the motor vehicle equipped with the shaft and the predetermined breaking body has a particularly advantageous NVH (noise, vibration, harshness) behavior.

According to a further refinement of the predetermined breaking body, at least one of the sub-bodies is designed as a solid shaft element. This means that the first sub-body or the second sub-body can be designed as a solid shaft element. Furthermore, it is conceivable that the two sub-bodies are designed as a solid shaft element. By this means, the NVH advantages already presented are further reinforced.

In a further refinement of the predetermined breaking body, at least one of the sub-bodies of the predetermined breaking body can be designed as a hollow shaft element. This means that the first sub-body or the second sub-body is designed as a hollow shaft element. Furthermore, it can be provided that the first sub-body and the second sub-body are designed as respective hollow shaft elements. By this means, a particularly lightweight predetermined breaking body and, as a consequence, a particularly lightweight shaft are taken into account to a particular extent.

In a further refinement, the predetermined breaking body, in which at least one of the sub-bodies is designed as the hollow shaft element, has a flexurally rigid reinforcing element. An outer circumferential contour of the flexurally rigid reinforcing element and an inner circumferential contour of a cavity of the corresponding sub-body or hollow shaft element correspond to each other, wherein the flexurally rigid hollow shaft element extends along the longitudinal center axis with the corresponding sub-body. The flexurally rigid reinforcing element can completely penetrate the predetermined breaking body, that is to say the two sub-bodies, along the longitudinal center axis. If the predetermined breaking body therefore has the two sub-bodies in the form of the respective hollow shaft element, it can be provided that the flexurally rigid reinforcing element extends through the two sub-bodies axially or coaxially. The outer circumferential contour of the reinforcing element and the inner circumferential contour of the cavity of the sub-bodies or of the hollow shaft elements are directly adjacent to each other. Provision can be made, for example, that a force-fitting, form-fitting and/or integrally bonded connection is formed between the outer circumferential contour of the reinforcing element and the inner circumferential contour of the corresponding hollow shaft element or of the two hollow shaft elements. For example, the reinforcing element can be adhesively bonded in the cavity, that is to say in the interior of the respective hollow shaft element or of the hollow shaft elements. In this way, although the size of the predetermined breaking body or of the sub-bodies is increased, this is accepted in order to take the concept of particularly high NVH quality into account to a particular extent.

Alternatively or additionally to the reinforcing element, the predetermined breaking body—according to a development—can have a flexurally rigid sheathing element, the inner circumferential contour of which corresponds to an outer circumferential contour of the corresponding sub-body. The sheathing element extends along the longitudinal center axis, in particular coaxially, with the corresponding sub-body. The flexurally rigid sheathing element can completely surround the predetermined breaking body, that is to say the two sub-bodies. The flexurally rigid sheathing element—irrespective of whether one or both of the sub-bodies is/are designed as a solid shaft element or one or both of the sub-bodies is/are designed as a hollow shaft element—can therefore surround the outer circumferential contour of the predetermined breaking body or the outer circumferential contour of the corresponding sub-body. If, in the case of the predetermined breaking body, at least one of the sub-bodies is designed as the hollow shaft element, both the flexurally rigid reinforcing element which extends through the sub-body designed as the hollow shaft element and the flexurally rigid sheathing element which surrounds the corresponding sub-body on the outer circumferential side can be provided.

A force-fitting, form-fitting and/or integrally bonded connecting device can be provided between the inner circumferential contour of the flexurally rigid sheathing element and the outer circumferential contour of the corresponding sub-body; for example, the flexurally rigid sheathing element can be laminated onto an outer circumferential surface of the corresponding sub-body and/or of the predetermined breaking body.

A particularly high resistance to bending is conferred on the predetermined breaking body and, as a consequence, on the shaft equipped with the predetermined breaking body— at least in the region of the predetermined breaking body— by the reinforcing element and/or the sheathing element.

The disclosure furthermore relates to a shaft for a machine, in particular an electric machine, wherein the shaft has a first sub-shaft body and at least one second sub-shaft body. Furthermore, the shaft has a predetermined breaking body designed according to the above description, wherein the sub-shaft bodies are connected to one another for conjoint rotation by means of the predetermined breaking body. The shaft can have the predetermined breaking body as an integral component, which means that the sub-shaft bodies and the predetermined breaking body can be formed integrally with each other. Furthermore, it is conceivable that, during the production of the shaft, first of all the two sub-shaft bodies are provided separately from the predetermined breaking body, after which the sub-shaft bodies are then in each case connected, for example joined, to the predetermined breaking body in a force-fitting, form-fitting and/or integrally bonded manner. For example, two steel shaft halves can be fixed to each other for conjoint rotation via the predetermined breaking body which—as already presented—has the fiber-reinforced material structure or the metallic material. In this way, a point at which the shaft yields, during use as intended, upon reaching the first ultimate torsional moment or the second ultimate torsional moment, can be predetermined.

Features, advantages and advantageous refinements of the predetermined breaking body according to the disclosure should be regarded as features, advantages and advantageous refinements of the shaft according to the disclosure, and vice versa.

Furthermore, the disclosure relates to a machine, in particular a motor vehicle, with an electric drive machine, having at least one shaft designed according to the above description. The electric drive machine of the motor vehicle is in particular a traction motor in order to electrically drive or move the motor vehicle. Accordingly, the shaft is in particular an output shaft of the electric drive machine, and therefore a torque generated by means of the electric drive machine can be transmitted via the output shaft to at least one wheel of the motor vehicle, or vice versa.

Features, advantages and advantageous refinements of the predetermined breaking body according to the disclosure and/or of the shaft according to the disclosure should be regarded as features, advantages and advantageous refinements of the machine according to the disclosure, and vice versa.

With regard to the at least partially electrically driveable motor vehicle, wheels of the motor vehicle that are mounted on a rear axle must not lock in order to maintain a stable driving state. If, however, the motor vehicle has a rear axle drive, with the wheels of the rear axle being driveable or driven by means of the electric drive machine, and if the motor vehicle or the electric drive machine is operated in the recuperation operating mode, when a torque is transmitted from the wheels via the shaft to the electric drive machine, a counter torque generated by the electric drive machine must not be of such a high magnitude that the wheels mounted on the rear axle lock. By contrast, during the speed-increasing acceleration of the motor vehicle, a higher torque may occur in the shaft and is transmitted from the electric drive machine to the wheels. It can be seen by this that the shaft equipped with the predetermined breaking body is particularly advantageous since the shaft is designed, for example, in such a manner that the torque maximally occurring in the shaft in the recuperation operating mode is limited with respect to the second torsion direction by the ultimate torsional moment. By contrast, a higher ultimate torsional moment is provided with respect to the first torsion direction, and therefore a drive torque which is higher than the maximally permissible recuperation torque can be transmitted in the motorized mode of the electric drive machine to the wheels of the motor vehicle.

Further features of the disclosure may emerge from the claims, the figures and the description of the figures. The features and combinations of features mentioned above in the description and the features and combinations of features shown below in the description of the figures and/or in the figures alone can be used not only in the respectively stated combination, but also in other combinations or on their own without departing from the scope of the disclosure. In the drawings:

DETAILED DESCRIPTION OF THE DRAWINGS

In the figures, identical and functionally identical elements are provided with the same reference signs.

A predetermined breaking body 1 for a shaft 2 of a machine 3, the shaft 2 and the machine 3 are presented below in a joint description. The predetermined breaking body 1 is designed to transmit a first torque M1 by a rotation of the predetermined breaking body 1 in a first direction of rotation. In the process, the shaft 2 is twisted in a first torsion direction D1. Furthermore, the predetermined breaking body 1 is configured to transmit a second torque M2 by a rotation of the predetermined breaking body 1 in a second direction of rotation. In the process, the shaft 2 is twisted in a second torsion direction D2. The torsion directions D1, D2 are opposed to each other, and the torques M1, M2 differ in size.

Figures 1, 2, 3, 4:
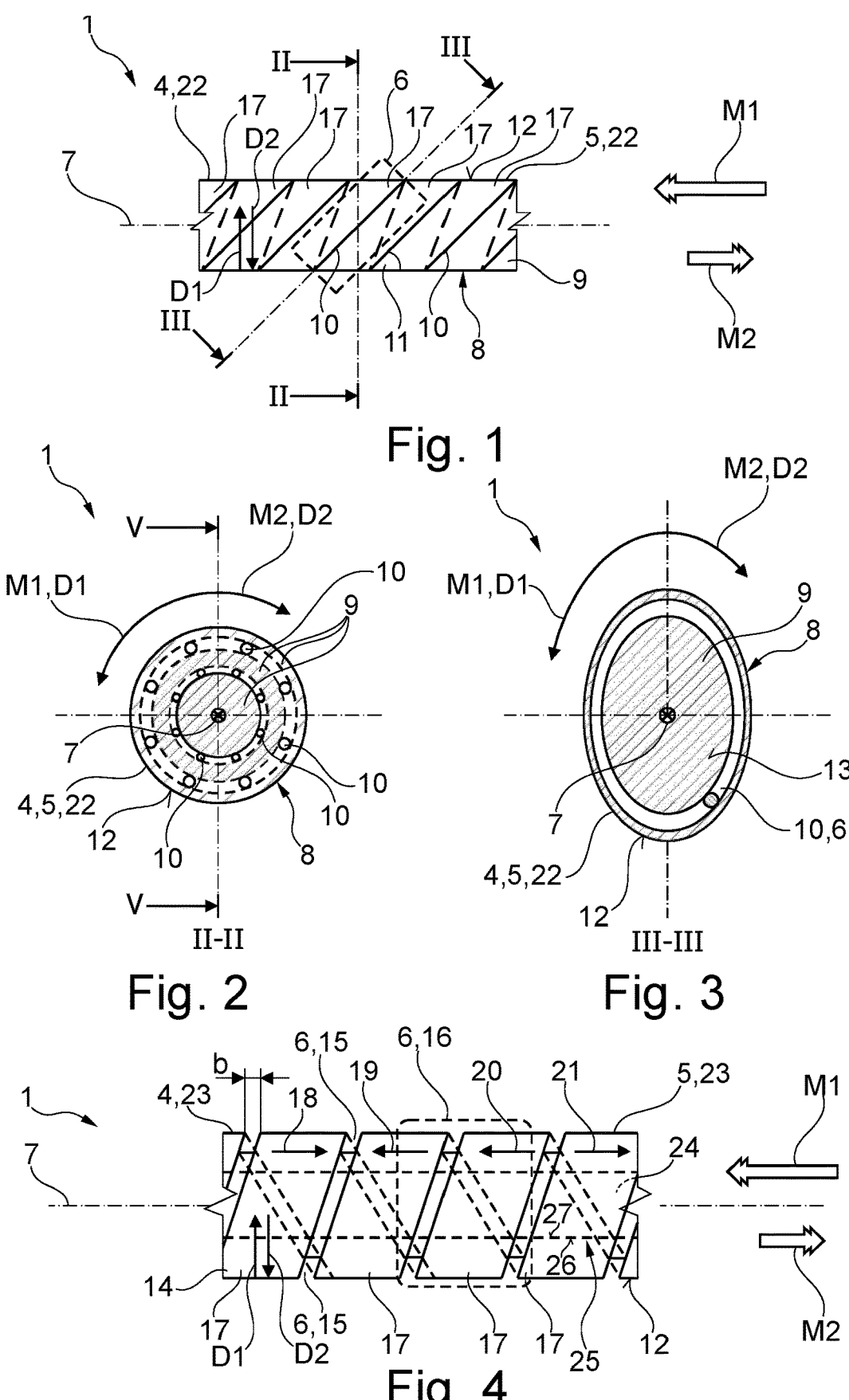
FIG. 1 shows a schematic view of a predetermined breaking body.
FIG. 2 shows a schematic view of the predetermined breaking body, the view being sectioned along a sectional plane II-II (see FIG. 1)
FIG. 3 shows a schematic view of the predetermined breaking body, the view being sectioned along a sectional plane III-III (see FIG. 1)
FIG. 4 shows a schematic view of the predetermined breaking body.

FIG. 1 shows, in a schematic view, the predetermined breaking body 1 which has a first sub-body 4 and a second sub-body 5. Furthermore, the predetermined breaking body 1 has a predetermined breaking element 6, wherein the sub-bodies 4, 5 are connected to each other for conjoint rotation by means of the predetermined breaking element 6. The sub-bodies 4, 5 and the predetermined breaking element 6 are connected to one another along a common longitudinal center axis 7 of the predetermined breaking body 1. The predetermined breaking element 6 can be an integral part of the first sub-body 4 and/or of the second sub-body 5. The two sub-bodies 4, 5 are, for example, formed integrally with each other. In particular, the two sub-bodies 4, 5 and the predetermined breaking element 6 are formed integrally with one another.

The predetermined breaking body 1, in particular the predetermined breaking element 6, is anisotropic, as a result of which, during the transmission of the first torque M1 between the sub-bodies 4, 5, the predetermined breaking element 6 yields in the first torsion direction D1 under a first predetermined ultimate torsional moment. Furthermore, the predetermined breaking body 1, in particular the predetermined breaking element 6, is designed, during transmission of the second torque M2 between the sub-bodies 4, 5, to yield in the second torsion direction D2, which is opposed to the first torsion direction D1, under a second predetermined ultimate torsional moment. The respective ultimate torsional moments differ in magnitude here. This means that the two ultimate torsional moments differ not only in respect of a respective direction of rotation.

In a first refinement, the predetermined breaking body 1 has a fiber-reinforced material structure 8, in the carrier material matrix 9 of which a reinforcing fiber 10 or a plurality of reinforcing fibers 10 is or are embedded. The reinforcing fibers are arranged at a fiber angle 11 with respect to the longitudinal center axis 7 of the sub-bodies 4, 5 or of the predetermined breaking body 1. In other words, the longitudinal center axis 7 and the reinforcing fiber 10 or reinforcing fibers 10 enclose the fiber angle 11 with one another. The fiber angle differs from 0 degrees and from 90 degrees, for example the fiber angle is between 10 degrees and 80 degrees. In this refinement, at least one of the reinforcing fibers 10 acts as the predetermined breaking element 6. This is because, in the example here, the reinforcing fibers 10 are loaded in tension if, by means of the predetermined breaking body 1 or by means of the shaft 2 equipped with the predetermined breaking body 1, the first torque M1 is transmitted and, as a result/in the process, the shaft 2 or the predetermined breaking body 1 is twisted in the first torsion direction D1. By contrast, the reinforcing fibers 10 are loaded in thrust and/or compression if, by means of the shaft 2 or by means of the predetermined breaking body 1, the second torque M2 is transmitted and, as a result/in the process, the shaft 2 or the predetermined breaking body 1 is twisted in the second torsion direction D2. If, in the first torsion direction D1, the first ultimate torsional moment is reached or exceeded, a maximum tensile loading of the reinforcing fibers 10, in particular of the reinforcing fiber 10 which forms the predetermined breaking element 6, is thereby exceeded, as a result of which the corresponding reinforcing fiber 10 tears. By contrast, the material of the carrier material matrix 9 slides along the corresponding reinforcing fiber 10 if the predetermined breaking body 1 or the shaft 2 reaches or exceeds the second ultimate torsional moment in the second torsion direction D2. In this case, a seed for a torsional fracture of the carrier material matrix 9 is formed by the predetermined breaking element 6 or the reinforcing fiber 10 forming the predetermined breaking element 6.

The reinforcing fibers 10 are embedded in the carrier material matrix 9 in particular in accordance with a helix or in accordance with a screw with respect to the longitudinal center axis 7. This fiber-reinforced material structure 8, that is to say the correspondingly designed predetermined breaking body 1, is therefore anisotropic in respect of a torque transmission in the directions of rotation D1, D2. It is thus advantageously achieved that the predetermined breaking body 1, and consequently the shaft 2, has a different ultimate torsional moment depending on the torsion direction D1, D2. This means that, for the transmission of torque, the shaft 2 or the predetermined breaking body 1 can be loaded with torsion to differing degrees depending on the torsion direction D1, D2. The ultimate torsional moments are predetermined or predeterminable by a corresponding material selection of the fiber-reinforced material structure 8 and/or the reinforcing fibers 10. Furthermore, the ultimate torsional moments are predetermined or predeterminable by the fiber angle 11 being correspondingly selected.

FIG. 2 shows a schematic view of the predetermined breaking body 1, the view being sectioned along a sectional plane II-II (see FIG. 1), wherein it can be seen how the reinforcing fibers 10 are embedded in the carrier material matrix 9. It should be understood that the carrier material matrix 9 can have more than just one layer of reinforcing fibers 10. For example, the carrier material matrix 9 can be penetrated to a great extent by reinforcing fibers 10 between an outer circumferential surface of the predetermined breaking body 1 or of the corresponding sub-body 4, 5 as far as the longitudinal center axis 7.

FIG. 3 shows a schematic view of the predetermined breaking body 1, the view being sectioned along a sectional plane III-III (see FIG. 1), with a breaking surface 13 of the predetermined breaking body 1 being indicated by the sectional plane III-III in the present example. The reinforcing fiber 10 which is arranged in this example in accordance with the helix or screw and which forms the predetermined breaking element 6 is torn off because the first ultimate torsional moment is reached or exceeded, whereupon the carrier material matrix 9 is broken off along the corresponding reinforcing fiber 10. Alternatively, the corresponding reinforcing fiber 10 or the predetermined breaking element 6 has been loaded too severely with compression or thrust when the second ultimate torsional moment is reached or exceeded since the carrier material matrix 9 is broken at this point, as a result of which the carrier material matrix 9 has been twisted off along the corresponding reinforcing fiber 10 such that the corresponding reinforcing fiber 10 is then torn off.

FIG. 4 shows a schematic view of the predetermined breaking body 1 in a further refinement, wherein the predetermined breaking body 1 is formed from a metallic material 14 and has at least one material recess 15 between the sub-bodies 4, 5. The material recess 15 extends from the outer circumferential surface 12 radially in the direction of the longitudinal center axis 7, wherein the predetermined breaking element 6 is formed by the at least one material recess 15. In the present example, the material recess 15 is helical, wherein the predetermined breaking body 1 has at least one full thread 16 of the helical material recess 15 between the sub-bodies 4, 5. The predetermined breaking element 6 is formed by this full thread 16 of the helical material recess 15. Although not explicitly illustrated in the figures, it is nevertheless entirely conceivable for the predetermined breaking body 1 to have a plurality of material recesses 15 which are formed independently of one another on/in the outer circumferential surface 12. The material recesses 15 then do not open into one another, but rather are formed, for example, by separately formed slots or grooves in/on the outer circumferential surface 12.

The axial width b of the material recess 15 or the material recesses 15 that is illustrated in FIG. 4 is shown in such a wide size only for illustrative reasons. It should be understood that the width b is actually selected in such a manner that sections 17 of the corresponding sub-body 4, 5, which sections are spaced apart from one another directly via one of the material recesses 15, come to lie directly on one another by twisting of the predetermined breaking body 1 in the first torsion direction D1 (see arrows 18, 19), as a result of which it is ensured that the—for example larger—first torque M1 can be transmitted by means of the predetermined breaking body 1. By contrast, the two sections 17 of the corresponding sub-body 4, 5, which sections are spaced apart from each other via the corresponding material recess 15, are pulled apart (see arrows 20, 21) when the predetermined breaking body 1 is loaded in the second torsion direction D2 with the second torque M2 which is in particular smaller than the first torque M1. In the breaking situation, the two sections 17 which are spaced apart from each other via the corresponding material recess 15 then slide along each other, whereas, when the predetermined breaking body 1 is loaded with the first torque M1, this breaking situation occurs only when the sections 17 lying on one another because of the associated torsion of the predetermined breaking body 1 slide along one another with a frictional connection between these sections 17 being overcome.

According to FIG. 1, FIG. 2 and FIG. 3, the predetermined breaking body 1 has the sub-bodies 4, 5 which, in the present example, are designed as a respective solid shaft element 22 according to the corresponding figures. However, it should be understood that at least one of the sub-bodies 4, 5 can be designed as a hollow shaft element 23. This applies both to the predetermined breaking body 1, which has the fiber-reinforced material structure 8, and to the predetermined breaking body 1, which has the metallic material 14. The fact that the sub-bodies 4, 5 can be designed as the respective hollow shaft element 23 is illustrated, for example, in FIG. 4 and FIG. 5. In one example (see FIG. 4), the two sub-bodies 4, 5 are designed as a respective hollow shaft element 23. In this case, the in particular spirally or helically formed material recess 15 or the differently formed material recess 15 or the material recesses 15 can completely penetrate the corresponding hollow shaft element 23 or the corresponding sub-body 4, 5 from the outer circumferential surface 12 as far as a material-free cavity 24 of the hollow shaft element 23. By contrast, the corresponding material recess 15 ends in the radial direction before a solid material core of the corresponding sub-body 4, 5 if the latter is designed as the solid shaft element 22. Furthermore, the corresponding material recess 15 can end before the cavity 24 in the radial direction.

Furthermore, it is illustrated in FIG. 4 that the predetermined breaking body 1 can have a flexurally rigid reinforcing element 25, the outer circumferential contour 26 of which corresponds to an inner circumferential contour 27 of the cavity 24 of the corresponding sub-body 4, 5 and extends along the longitudinal center axis 7 with the corresponding sub-body 4, 5. The reinforcing element 25 can be, for example, a basic shaft which can be formed from the same material as the corresponding sub-body 4, 5 or from a different material from the corresponding sub-body 4, 5. It is conceivable, for example, that the corresponding sub-body 4, 5 is formed from the fiber-reinforced material structure 8, whereas the reinforcing element 25 or the basic shaft is formed from a metallic material. The same is also conceivable the other way around.

Figure 5:
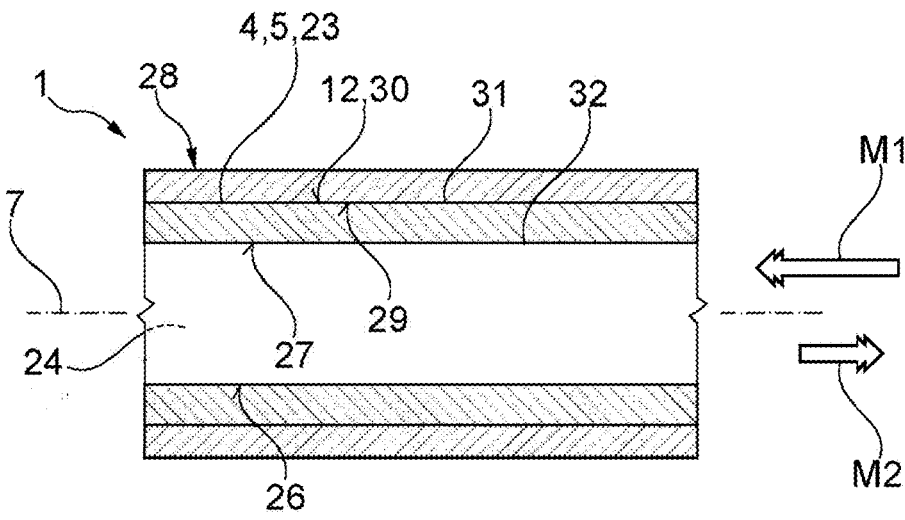
FIG. 5 shows a schematic view of the predetermined breaking body, the view being sectioned along a sectional plane V-V (see FIG. 2), with a sheathing element.

FIG. 5 illustrates a schematic view of the predetermined breaking body 1, the view being sectioned along a sectional plane V-V (see FIG. 2), wherein the predetermined breaking body 1 has a sheathing element 28. The sheathing element 28 can be provided alternatively or additionally to the reinforcing element 25. Therefore, if the corresponding sub-body 4, 5 is designed as the solid shaft element 22, this sub-body 4, 5 can have the sheathing element 28. If the corresponding sub-body 4, 5 is designed as the hollow shaft element 23, this sub-body 4, 5 can have the reinforcing element 25 and/or the sheathing element 28. The sheathing element 28, which is in particular flexurally rigid, has an inner circumferential contour 29 which corresponds to an outer circumferential contour 30, that is to say the outer circumferential surface 12, of the corresponding sub-body 4, 5. The sheathing element 28 extends along the longitudinal center axis 7 with the corresponding sub-body 4, 5.

For the sake of simplicity, the predetermined breaking element 6 is not illustrated graphically in FIG. 5. However, it should be understood that the predetermined breaking body 1 always has the predetermined breaking element 6 or a plurality of such predetermined breaking elements 6.

In the present example, a connecting device 31 is provided between the outer circumferential surface 12 or the outer circumferential contour 30 of the corresponding sub-body 4, 5 and the sheathing element 28, by means of which connecting device the inner circumferential contour 29 of the sheathing element 28 and the outer circumferential contour 30 of the corresponding sub-body 4, 5 are connected to each other in a force-fitting, form-fitting and/or integrally bonded manner. In this way, a translational relative movement between the sheathing element 28 and the corresponding sub-body 4, 5 is effectively prevented. In the present example, a further connecting device 32 is provided between the outer circumferential contour 26 of the reinforcing element 25 and the inner circumferential contour 27 of the corresponding sub-body 4, 5. As a result, the reinforcing element 25 or the basic shaft and the corresponding sub-body 4, 5 or the predetermined breaking body 1 are fixed on each other in a force-fitting, form-fitting and/or integrally bonded manner such that a translational relative movement between the reinforcing element 25 and the corresponding sub-body 4, 5 is effectively prevented. For example, the reinforcing element 25 can be adhesively bonded in the cavity 24. The sheathing element 28 and the outer circumferential surface 12 of the corresponding sub-body 4, 5 can be fixed on each other in a force-fitting, form-fitting and/or integrally bonded manner by means of a lamination connection, a vulcanization connection and/or in some other way.

The reinforcing element 25 or the basic shaft and/or the sheathing element 28 can alternatively or additionally in each case have a further predetermined breaking element (not illustrated) or a plurality of further predetermined breaking elements, which is/are designed similarly or identically to the above-described predetermined breaking element 6.

Figure 6:
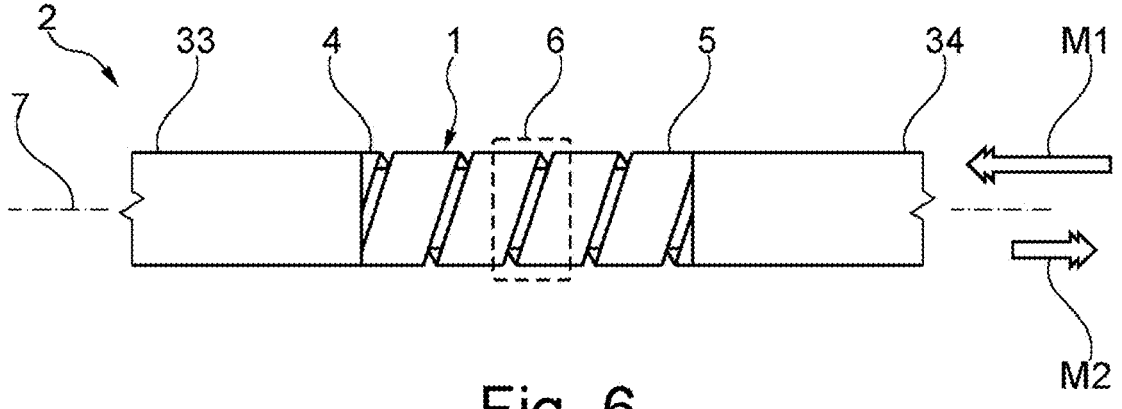
FIG. 6 shows a schematic view of a shaft which has the predetermined breaking body.

The shaft 2, which has a predetermined breaking body 1 designed according to the description above, is illustrated in a schematic view in FIG. 6. The shaft 2 has a first sub-shaft body and at least one further (second) sub-shaft body 34. Furthermore, the shaft 2—as already explained—has the predetermined breaking body 1 via which the sub-shaft bodies 33, 34 are connected to each other for conjoint rotation. It is conceivable that the first sub-shaft body 33 and the first sub-body 4 are formed integrally with each other. Furthermore, it is conceivable that the second sub-shaft body 34 and the second sub-body 5 are formed integrally with each other. At any rate, the first sub-shaft body 33 and the first sub-body 4 are connected to each other in a force-fitting, form-fitting and/or integrally bonded manner. Furthermore, the second sub-shaft body 34 and the second sub-body 5 are connected to each other in a force-fitting, form-fitting and/or integrally bonded manner. The respective sub-shaft body 33, 34 and the respective sub-body 4, 5 are connected to each other for conjoint rotation. Furthermore, it is conceivable that the respective sub-shaft body 33, 34 is formed by the corresponding sub-body 4, 5, or vice versa. In other words, the shaft 2 can be formed over its entire length by the predetermined breaking body 1. It is illustrated according to FIG. 6 that the sub-shaft bodies 33, 34 and the predetermined breaking body 1 are first of all provided separately from one another during the production of the shaft 2 and are then connected or joined to the shaft 2. The sub-shaft bodies 33, 34 and the predetermined breaking body 1 share a common longitudinal center axis, for example the longitudinal center axis 7 of the predetermined breaking body 1. As a result, a longitudinal center axis (not illustrated) of the shaft 2 and the longitudinal center axis 7 of the predetermined breaking body 1 coincide, as a result of which the longitudinal center axis of the shaft 2 is formed by the longitudinal center axis 7 of the predetermined breaking body 1. The sub-shaft bodies 33, 34 can be formed from a different material from the predetermined breaking body 1. The sub-shaft bodies 33, 34 of the shaft 2 can be formed—jointly or differently from each other—as a respective solid shaft element and/or as a hollow shaft element.

Figure 7:
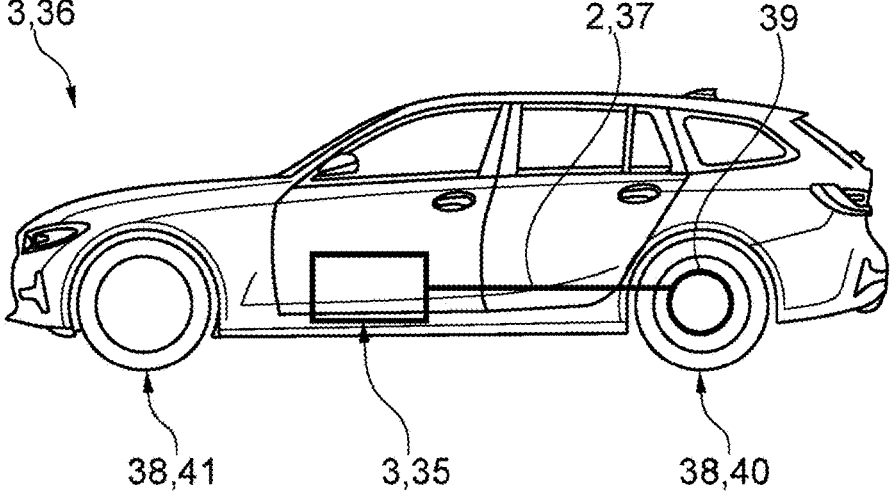
FIG. 7 shows a schematic view of a machine with the shaft.

FIG. 7 illustrates the machine 3 with the shaft 2 in a schematic view. This means that the machine 3 has the shaft 2. The machine 3 is in particular an electric machine 35 which acts, for example, as a traction motor for an at least partially electrically driveable or movable motor vehicle 36. Alternatively or additionally, the motor vehicle 36 is the machine 3 which is equipped with the shaft 2. The respective machine 3, 35, 36 can have a plurality of shafts 2.

In the present example, an output shaft 37 of the electric machine 35 is formed by the shaft 2. The electric machine 35 or the traction motor and a wheel 38 of the motor vehicle 36 are connected or coupled to each other by means of the output shaft 37, optionally via a wheel gear 39, in order to transmit torque. According to FIG. 7, the electric machine 35 can be coupled via the shaft 2 and via the wheel gear 39 to a rear wheel 40 of the motor vehicle 36 for torque transmission, for example when the motor vehicle 36 is equipped with rear-wheel drive. This does not exclude that the electric machine 35 is alternatively or additionally coupled or couplable to a front wheel 41 of the motor vehicle 36 for torque transmission. Furthermore, it is conceivable that the shaft 2 is designed and used as a wheel drive shaft, wherein the shaft 2 is then an output element of the wheel gear 39 or is connected to an output element of the wheel gear 39 for conjoint rotation. For example, the shaft 2 can be arranged between the wheel gear 39 and the wheel 38. At any rate, the shaft 2 is then connected to the corresponding wheel 38 for conjoint rotation, and therefore the wheel 38 can be driven via the shaft 2. By this means, the shaft 2 can be reached particularly easily—for maintenance and/or repair purposes.

In an error situation of the electric machine 35 or of the motor vehicle 36, a defined braking torque, for example the second torque M2, which would be transmitted by means of the shaft 2 from the rear wheel 40 to the electric machine 35 in a recuperation mode or generator mode of the electric machine 35, must not be exceeded. This is achieved particularly efficiently and simply by the predetermined breaking body 1 or by the shaft 2 provided with the predetermined breaking body 1, wherein, nevertheless, in a motorized mode of the electric machine 35, a drive torque, for example the first torque M1, can be transmitted to the rear wheel 40 by means of the same shaft 2, the magnitude of which torque is greater than the magnitude of the braking moment caused by the recuperation mode.

Overall, the disclosure shows how, by means of the predetermined breaking body 1, by means of the shaft 2 and/or by means of the machine 3, torque transmission in a first direction of rotation or torsion direction can be limited to a first ultimate moment and in a second direction of rotation or torsion direction to a second ultimate moment different from the first ultimate moment.

LIST OF REFERENCE SIGNS

1 predetermined breaking body
2 shaft
3 machine
4 sub-body
5 sub-body 6 predetermined breaking element
7 longitudinal center axis
8 fiber-reinforced material structure
9 carrier material matrix
10 reinforcing fiber
11 fiber angle
12 outer circumferential surface
13 breaking surface
14 metallic material
15 material recess
16 thread
17 section
18 arrow
19 arrow
20 arrow
21 arrow
22 solid shaft element
23 hollow shaft element
24 cavity
25 reinforcing element
26 outer circumferential contour
27 inner circumferential contour
28 sheathing element
29 inner circumferential contour
30 outer circumferential contour
31 connecting device
32 connecting device
33 sub-shaft body
34 sub-shaft body
35 electric machine
36 motor vehicle
37 output shaft
38 wheel
39 wheel gear
40 rear wheel
41 front wheel
b width
D1 torsion direction
D2 torsion direction
M1 torque
M2 torque

What is claimed is:

1. A predetermined breaking body of a shaft of a machine, comprising:

a first sub-body;

a second sub-body; and a predetermined breaking element, wherein the first and second sub-bodies are connected to one another, so as to conjointly rotate, along a longitudinal center axis of the predetermined breaking body via the predetermined breaking element, the predetermined breaking element is anisotropic, such that during transmission of a torque between the sub-bodies, the predetermined breaking element yields in a first torsion direction under a first predetermined ultimate torsional moment and yields in a second torsion direction opposed to the first torsion direction under a second predetermined ultimate torsional moment, and the predetermined ultimate torsional moments differ in size.

2. The predetermined breaking body according to claim 1, wherein the predetermined breaking body has a fiber-reinforced material structure, in the carrier material matrix of which are embedded reinforcing fibers which are arranged at a fiber angle different from 0° and from 90° with respect to the longitudinal center axis of the predetermined breaking body, and at least one of the reinforcing fibers acts as the predetermined breaking element.

3. The predetermined breaking body according to claim 1, wherein the predetermined breaking body is formed from a metallic material, and the predetermined breaking body has, between the sub-bodies, a material recess which extends from an outer circumferential surface of the predetermined breaking body radially in the direction of the longitudinal center axis of the predetermined breaking body, as a result of which the predetermined breaking element is formed by the material recess.

4. The predetermined breaking body according to claim 3, wherein the material recess is helical and the predetermined breaking body has, between the sub-bodies, a full thread of the helical material recess, with the predetermined breaking element being formed by this thread of the helical material recess.

5. The predetermined breaking body according to claim 4, wherein one of the sub-bodies is designed as a solid shaft element.

6. The predetermined breaking body according to claim 5, wherein one of the sub-bodies is configured as a hollow shaft element.

7. The predetermined breaking body according to claim 6, further comprising:

a flexurally rigid reinforcing element, the outer circumferential contour of which corresponds to an inner circumferential contour of a cavity of the corresponding sub-body and extends along the longitudinal center axis with the corresponding sub-body.

8. The predetermined breaking body according to claim 7, further comprising:

a flexurally rigid sheathing element, an inner circumferential contour of which corresponds to an outer circumferential contour of the corresponding sub-body and extends along the longitudinal center axis with the corresponding sub-body.

9. A shaft for a machine, having a first sub-shaft body and a second sub-shaft body and having a predetermined breaking body according to claim 8, wherein the sub-shaft bodies are connected to one another so as to conjointly rotate via the predetermined breaking body.

10. The shaft according to claim 9, wherein the shaft and the predetermined breaking body are formed integrally with each other.

11. A machine having a shaft according to claim 10.

* * * * *